US 7,720,745 B2

(12) United States Patent
Powell et al.

(10) Patent No.: US 7,720,745 B2
(45) Date of Patent: May 18, 2010

(54) METHOD AND SYSTEM FOR IMPLEMENTING CATALOG INVENTORY AUCTIONS IN AN ELECTRONIC EXCHANGE

(75) Inventors: Kim Powell, Niwot, CO (US); Liza Lyons, Purcellville, VA (US); Dave Stephens, Merced, CA (US); Ben Gu, Foster City, CA (US); James Wang, Fremont, CA (US); Kareem Benjamin, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 405 days.

(21) Appl. No.: 09/912,891

(22) Filed: Jul. 24, 2001

(65) Prior Publication Data

US 2009/0112772 A1    Apr. 30, 2009

Related U.S. Application Data

(60) Provisional application No. 60/266,904, filed on Feb. 6, 2001.

(51) Int. Cl.
*G06Q 40/00* (2006.01)
(52) U.S. Cl. ........................................ 705/37
(58) Field of Classification Search .......... 705/35, 705/37, 36, 25–28, 36 R
See application file for complete search history.

(56) References Cited

U.S. PATENT DOCUMENTS 6,006,201 A * 12/1999 Berent et al. ................. 705/27
6,199,050 B1   3/2001 Alaia et al.
6,243,691 B1 * 6/2001 Fisher et al. .................. 705/37
6,324,520 B1 * 11/2001 Walker et al. ................ 705/16
6,324,522 B2 * 11/2001 Peterson et al. .............. 705/28
6,366,891 B1   4/2002 Feinberg
6,415,270 B1 * 7/2002 Rackson et al. ............ 705/36 R
6,499,018 B1 * 12/2002 Alaia et al. ................... 705/37
6,606,608 B1 * 8/2003 Bezos et al. ............... 705/36 R
6,704,713 B1   3/2004 Brett
7,272,579 B1 * 9/2007 Canali et al. ................. 705/37

(Continued)

OTHER PUBLICATIONS

"MindCorps, Inc. Innovates Electronic Commerce Solutions with Microsoft Site Server 3.0"; Business Wire; Apr. 27, 1998; pp. 1 and 2.*

(Continued)

*Primary Examiner*—Ella Colbert
(74) *Attorney, Agent, or Firm*—Townsend and Townsend and Crew LLP

(57) ABSTRACT

An auction method for specifying catalog contents for packaging and pushing to an electronic auction. The auction method is implemented in an electronic commerce exchange. The auction method includes the steps of specifying catalog contents for packaging for an auction operation hosted on the electronic exchange. Initial terms for the sale of the contents are then specified. The auction is then automatically initiated using the previously specified contents and the previously specified terms. The auction proceeds with the receiving of bids for the contents from remote bidders. The bids are received via a distributed computing network into which the electronic commerce exchange is communicatively coupled. A winning bid is selected by determining a most competitive bid out of the bids received for the contents. A sale of the contents is then completed based upon the terms of the most competitive bid.

14 Claims, 5 Drawing Sheets

U.S. PATENT DOCUMENTS

| | | | | |
|---|---|---|---|---|
| 2001/0039528 | A1* | 11/2001 | Atkinson et al. | 705/37 |
| 2001/0042039 | A1* | 11/2001 | Rupp et al. | 705/37 |
| 2001/0044751 | A1* | 11/2001 | Pugliese et al. | 705/26 |
| 2002/0007338 | A1 | 1/2002 | Do | |
| 2002/0026391 | A1* | 2/2002 | Laster et al. | 705/28 |
| 2002/0103721 | A1* | 8/2002 | Wiesehuegel et al. | 705/27 |
| 2002/0147666 | A1* | 10/2002 | Baseman et al. | 705/28 |
| 2003/0093355 | A1* | 5/2003 | Issa | 705/37 |
| 2003/0158804 | A1* | 8/2003 | Francis et al. | 705/37 |

OTHER PUBLICATIONS

Mat Johnson; Transforming B2B Exchanges into Collaborative Trading Communities; 2000; pp. 1-6.*

Ellen Messmer; "B2B Websites not living up to hype yet"; Feb. 21, 2000; pp. 1 and 2.*

Fred Hapgood; "looking to Unload That Excess Inventory? Internet Acutions Deliver Buyers Willing to Pay More Than the Posted Price"; Sep. 1997; pp. 65-67.*

Ebay Help, Basics—Frequently Asked Questions on Bidding; Feb. 29, 2000, found on www.archive.org; pp. 1-5.

U.S. Appl. No. 09/924,671, filed Jul. 24, 2001, Non-Final Office Action dated Aug. 14, 2006, 8 pgs.

U.S. Appl. No. 09/924,671, filed Jul. 24, 2001, Final Office Action dated Apr. 19, 2007, 9 pgs.

U.S. Appl. No. 09/924,671, filed Jul. 24, 2001, Non-Final Office Action dated Aug. 29, 2007, 10 pgs.

U.S. Appl. No. 09/924,671, filed Jul. 24, 2001, Non-Final Office Action dated May 28, 2008, 13 pgs.

U.S. Appl. No. 09/924,671, filed Jul. 24, 2001, Final Office Action dated Dec. 9, 2008, 16 pgs.

U.S. Appl. No. 09/924,671, filed Jul. 24, 2001, Advisory Action dated Feb. 25, 2009, 3 pgs.

U.S. Appl. No. 09/924,671, filed Jul. 24, 2001, Non-Final Office Action dated May 28, 2009, 13 pgs.

* cited by examiner

METHOD AND SYSTEM FOR IMPLEMENTING CATALOG INVENTORY AUCTIONS IN AN ELECTRONIC EXCHANGE

This application claims the benefit of earlier filed U.S. Provisional Application Ser. No. 60/266,904, filed Feb. 6, 2001

FIELD OF THE INVENTION

The field of the present invention pertains to efficient implementation and management of electronic commerce buying and selling operations on a distributed computer network. More particularly, the present invention relates to a method and system for implementing of catalog inventory auctions in electronic commerce buying and selling operations.

BACKGROUND OF THE INVENTION

Buyers and sellers use a variety of techniques to ensure goods and services meet their mutual expectations. However, traditional procurement systems have been proven to be error prone, labor intensive, and costly operations. For example, often times, when a buyer is looking to purchase a batch of articles, a buyer might negotiate terms for the purchase prior to making the purchasing decision. The negotiation allows the buyer and seller to ensure the articles and terms (e.g., price, quantity, delivery conditions, etc.) will meet any specific requirements. As is generally known, it is advantageous to consider many alternative buyers/sellers when negotiating terms. A larger number of buyers and sellers available, for example, to bid on articles of manufacture, usually leads to a more efficient matching of requirements between buyers and sellers (e.g., getting the best deal). Traditional buying and selling mediums, such as auctions, catalog based purchasing, and selling, and the like, do not always facilitate the most efficient matching of requirements. Alternatively, when prior inspection of an article is not possible or practical, the seller may provide the buyer with specifications describing the properties of the articles. The recent ascendancy of electronic commerce provides a means of avoiding, or at least reducing, the problems presented by the use of traditional buying and selling mediums.

In many respects, the Internet and the World Wide Web based network technologies have largely eliminated the most labor intensive and costly portions of the buying and selling type commerce operations (e.g., the use of mass mailings, printed specifications, catalogs, updating preprinted product information, etc.). However, many of the old problems still remain. For example, the fact that a buyer may find a seller from whom to purchase a batch of articles "on-line", does not change the fact that the buyer might not be aware of a more favorable purchase opportunity from a different seller prior to making the purchasing decision. Even when negotiation and/ or inspection of all articles from all possible sellers is not practical, the buyer would find very helpful a comprehensive system for gathering offers from a large, widely distributed number of sellers.

To avoid these problems, a variety of electronic commerce facilitating schemes were developed. One such scheme involved the use of business-to-business buying and selling exchanges implemented on the Internet. The term "electronic commerce" or "e-commerce" originally evolved from remote forms of electronic shopping to mean all aspects of business and market processes enabled by wide area communications networks, namely, the Internet and the World Wide Web based network technologies. E-commerce is a rapidly growing field, and is generally understood to mean doing business on-line or selling and buying products and services through Web (e.g., Internet based) storefronts or through other similar distributed computer networks. In general, electronic commerce is substantially similar to the more traditional catalog based commerce schemes. The business-to-business e-commerce exchanges, or simply "B2B exchanges" have evolved to focus on the specific needs and requirements of buying and selling between businesses.

As the use of B2B exchanges has proliferated, the implementation of electronic commerce auctions has become increasingly common. The use of electronic commerce catalog based buying and selling, or simply electronic catalogs, has become a preferred method of efficiently making available in large number of goods and services to a large number of potential buyers. Electronic catalogs provide a convenient means for aggregating large number of potential items for sale and efficiently disseminating information about these items to a large number of potential buyers.

Auctions are different from traditional catalog based commerce schemes. Auctions generally aggregate buyers or sellers to purchase or sell items/services through the respective submission of competitive bids. Generally, the most competitive bid is designated the winner of the auction. For example, in an auction amongst multiple competing buyers, the most competitive bid is usually the bid offering the most money for the specified item or service. In an auction amongst multiple competing sellers, the most competitive bid is usually the bid offering the specified item or service for the lowest price. Buyers and sellers participating in an auction compete with one another on the basis of the terms of their bids. Auctioneers have an interest in making the bidding process as competitive as possible to effect the most efficient matching of requirements between sellers and buyers (e.g., getting the best deal). Large numbers of buyers or sellers competitively trying to outbid one another usually leads to the most favorable terms.

However, auctions are usually inefficient with regard to disseminating large amounts of information about many different types of goods and services available for purchase. Auctions tend to be directed towards a limited number or type of goods per each auction operation. Where a manufacture has a large product line available for purchase, electronic catalogs, having the manufacturer's entire product line available for selection and purchase on-line, are more favored.

There is a problem however, in the fact that the terms of sale for electronic catalogs tend to be fixed. For example, the seller makes available the product line by specifying any specific characteristics of the individual products and the prices of individual products. Buyers make their purchasing decisions based upon this information. Products showing greater than predicted demand tend to be sold out. Any products showing less than predicted demand tend to remain unsold.

Hence, sellers face a large degree of uncertainty with regard to pricing items in their product catalog or otherwise setting terms. Some items have a pricing history which leads to less uncertainty with regard to supply and price/terms. However, new items have no such history and are thus much more prone to mismatches with regard to supply and or price/ terms. These errors pose a significant financial penalty to the seller.

Thus, what is required is a solution for efficiently providing the price competitiveness of auction based selling with the efficiency aspects of catalog based selling. The required solution should be readily configurable by a user to reduce risks inherent with setting pricing/terms of new items for electronic catalogs. Additionally, the required solution should be compatible with widely used electronic commerce enabling technology. The present invention provides a novel solution to the above requirements.

SUMMARY OF THE INVENTION

The present invention provides a solution for efficiently providing the price competitiveness of auction based selling with the efficiency aspects of catalog based selling. The present invention is readily configurable by a user to reduce risks inherent with setting pricing/terms of new items for electronic catalogs. Additionally, the present invention is compatible with widely used electronic commerce enabling technology.

In one embodiment, the present invention is implemented as an auction method for specifying catalog contents for packaging and pushing to an electronic auction. The auction method is implemented in an electronic commerce exchange. The auction method includes the steps of specifying catalog contents for packaging for an auction operation hosted on the electronic exchange. Initial terms for the sale of the contents are then specified. The auction is then automatically initiated using the previously specified contents and the previously specified terms. The auction proceeds with the receiving of bids for the contents from remote bidders. The bids are received via a distributed computing network into which the electronic commerce exchange is communicatively coupled. A winning bid is selected by determining a most competitive bid out of the bids received for the contents. A sale of the contents is then completed based upon the terms of the most competitive bid, using the widely used electronic commerce enabling technologies.

In so doing, a catalog based seller can combine the price competitiveness of auction based selling with the efficiency aspects of catalog based selling. The use of catalog content specification and the initial terms render the auction method configurable by the seller to reduce risks inherent with setting pricing/terms of new items for electronic catalogs.

BRIEF DESCRIPTION OF THE DRAWINGS

The present invention is illustrated by way of example and not by way of limitation, in the figures of the accompanying drawings and in which like reference numerals refer to similar elements and in which.

DETAILED DESCRIPTION OF THE INVENTION

Figure 1:
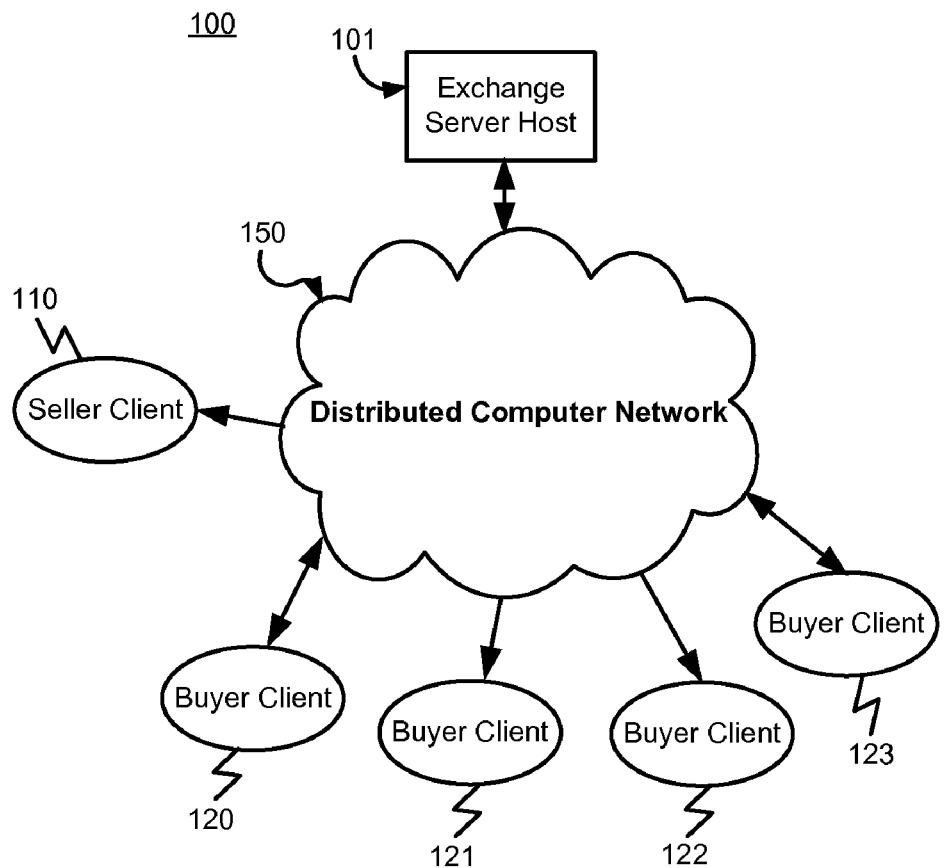
FIG. 1 shows a diagram of an electronic commerce auction operation in accordance with one embodiment of the present invention.

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

The present invention provides a method and system for implementing catalog inventory auctions in an electronic exchange. The present invention provides a solution for efficiently providing the price competitiveness of auction based selling with the efficiency aspects of catalog based selling. The present invention is readily configurable by a user to reduce risks inherent with setting pricing/terms of new items for electronic catalogs. Additionally, the present invention is compatible with widely used electronic commerce enabling technology. The present invention and its benefits are further described below.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "communicating" or "instantiating" or "registering" or "displaying" or the like, refer to the action and processes of a computer system (e.g., computer system 512 of FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Method and System of the Invention

Referring now to FIG. 1, a diagram of an electronic exchange auction system 100 in accordance with one embodiment of the present invention is shown. As depicted in FIG. 1, system 100 includes an exchange server host 101 communicatively coupled to a seller client 110 and a plurality of buyer clients 120-123 via a distributed computer network 150.

The exchange server host 101 functions as the central communications point for the auction operations, by conducting data collection and management of product information (e.g., items, services, or the like) provided by seller clients, such as seller client 110, and auction bid information provided by the buyer clients 120-123. Seller client 110 and buyer clients 120-123 communicate with exchange server host 101 via the communications protocols of distributed computer network 150, hereafter simply network 150. Exchange server host 101 conducts the auction operations on the basis of a comparison of the competing bid information from buyer clients 120-123.

A typical auction operation comprises buyer clients 120-123 accessing product information stored on exchange server host 101 by seller client 110 and submitting successive competing bids to exchange server host 101 for the product. The bids are transmitted from buyer clients 120-123 to exchange server host 101 via network 150. Similarly, the product information is provided to exchange server host 101 by seller client 110 via network 150.

The comparison of the competing bids submitted by buyer clients 120-123 is performed by exchange server host 101. Exchange server host 101 is configured to continuously receive and compare incoming bids and determine therefrom a bid status. The bid status includes information regarding the most competitive bid out of the bids received for the product, total number of bids received, any associated terms for the bids, and the like. In one embodiment, the bid status can be updated with each incoming new bid. At the conclusion of the auction, the bid status reveals the most competitive bid submitted and thus reveals the winner of the auction.

Referring still to FIG. 1, in accordance with the present embodiment, exchange server host 101 implements the method for implementing catalog inventory auctions hosted on electronic exchange auction system 100. The auction method implemented by exchange host server 100 enables the specification of catalog contents for packaging and the hosting of auction operations for the specified contents. The auction method is implemented within the client-server framework of system 100.

The auction method includes the step of specifying catalog contents for packaging for an auction operation hosted on the electronic exchange. For example, an exchange participant can be an operator of a catalog based selling operation, wherein the participant uses traditional catalog based techniques to aggregating a large number of potential items for sale and efficiently disseminate information about these items to a large number of potential buyers. The one or more catalogs can be traditional, printed catalogs, or can be more modern electronic catalogs. The exchange participant identifies one or more items from the catalog for packaging for an auction. The selection of the specific items can depend upon a number of factors, such as, for example, inventory concerns (e.g., excess supply of certain items), obsolescence (e.g., a certain product line is being discontinued), limited shelf life (e.g., perishable items), or the like. Generally, those catalog products showing less than predicted demand tend to be good candidates for packaging for auction operations. Alternatively, since products showing greater than predicted demand tend to be sold out, high demand products are also good candidates for packaging and auctioning to maximize their profitability.

Once the catalog contents have been specified by the auction participant, the initial terms for the sale of the contents are specified. The terms for the sale generally refer to conditions such as packaging, delivery, and the like. Terms can also include conditions such as, for example, enumeration of the authorized bidders, the minimum opening bid, a reserve (if any), and the like.

The auction is then automatically initiated by exchange server host using the previously specified contents and the previously specified terms. The auction proceeds with the receiving of bids for the contents from remote bidders. Bids are received from remote bidders via a distributed computer network, with exchange server host 101 continuously receiving and comparing incoming bids and updating the bid status, as described above. A winning bid is selected by determining a most competitive bid out of the bids received for the contents. A sale of the contents is then completed based upon the terms of the most competitive bid, using the widely used electronic commerce enabling technologies.

In so doing, system 100 of the present embodiment enables a catalog based seller to combine the price competitiveness of auction based selling with the efficiency aspects of catalog based selling. The use of catalog content specification and the initial terms render the auction method configurable by the seller to reduce risks inherent with setting pricing/terms of new items for electronic catalogs.

Referring still to FIG. 1, as described above, exchange server host 101 is configured to communicate with buyer clients 120-123 to disseminate auction related information. Such information can include, for example, bid status refresh and item attribute updates. Automatic bid status refresh provides updated bid status (e.g., information regarding the most competitive bid, total number of bids received, any associated bid terms, and/or the like) to each of the buyer clients 120-123, enabling each of buyer clients 120-123 to track the status of the bidding process as the auction operation unfolds. For example, as new bids are entered and received by exchange server host 101, the updated bid status is sent to buyer clients 120-123, allowing the auction participants to track the status of their respective bids and ascertain the competitiveness of their most recent bids. Additionally, since more complex auctions can involve competition on many terms other than price, attributes such as delivery conditions, special item features, volume discounts, and the like can also be included in the bid status updates sent to buyer clients 120-123.

It should be noted that in some embodiments, specifications for items for the auction can be changed dynamically as the auction is conducted. Any such changes are disseminated to the remote bidders via the distributed computer network in accordance with the update configuration information. This aspect allows, for example, a seller to alter the items of the auction operation dynamically based upon the activity level or number of incoming bids being received. Where unsatisfactory interest is evidenced, the specification for the items can be altered to provoke additional bidding.

It should be noted that the embodiment of the present invention depicted in FIG. 1 (e.g., system 100) is implemented as a software based process cooperatively executing on the respective computer system platforms of both exchange server host 101 and buyer clients 120-123. The basic components of the computer system platforms are shown in the example computer system 512 of FIG. 5 below. To provide the product information and bid status updates simultaneously to a large umber of other systems and to accept the incoming bids, it is desirable implement exchange server host 101 as a high speed, large capacity computer system platform such as, for example, a powerful multi-processor work station.

Referring still to FIG. 1, network 150 includes well known network technologies. For example, network 150 can be implemented using LAN technologies (e.g., Ethernet, Token-ring, etc.), the Internet, or other wired or wireless network technologies. The communications links between exchange server host 101, seller client 110, buyer clients 120-123 and network 150 can be implemented using, for example, a telephone circuit, communications cable, optical cable, wireless link, or the like.

Figure 2:
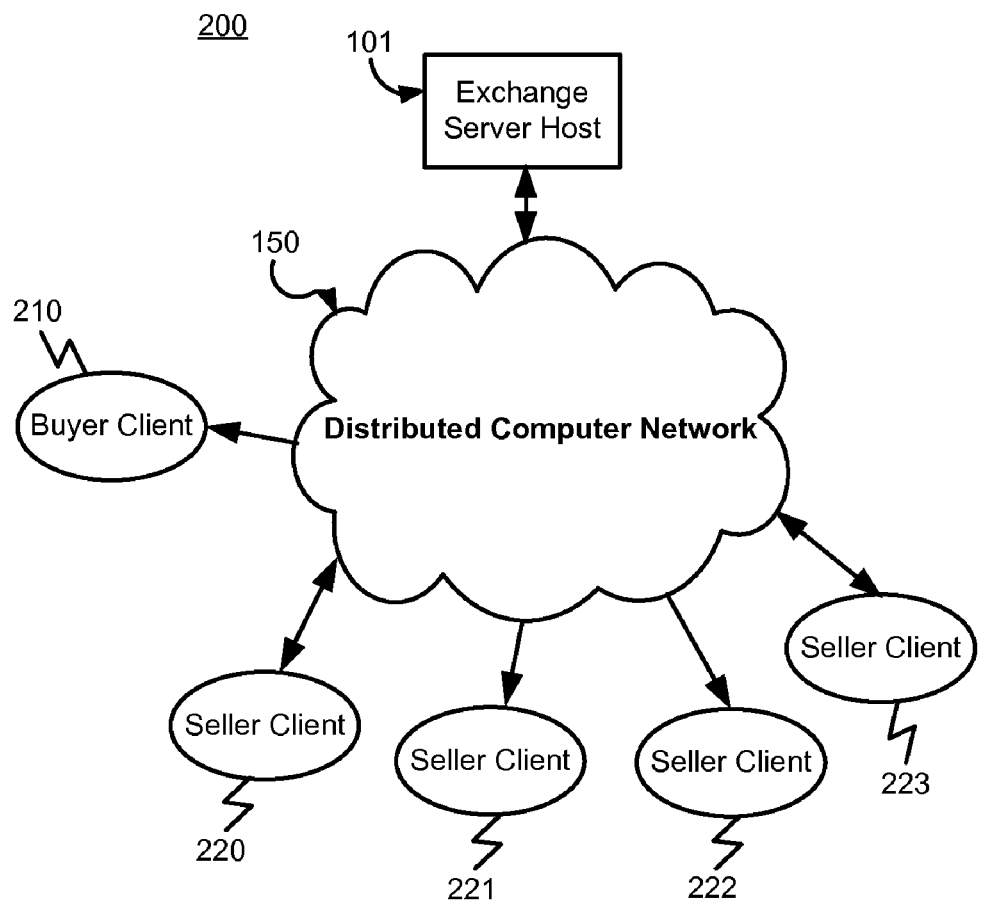
FIG. 2 shows a diagram of an electronic commerce auction operation in accordance with an alternative embodiment of the present invention.

FIG. 2 shows a system 200 in accordance with an alternative embodiment of the present invention. System 200 is substantially similar to system 100 of FIG. 1, however, system 200 depicts an auction operation wherein competing seller clients bid to sell products or services to a buyer client 210.

The auction operation depicted in FIG. 2 comprises seller clients 220-223 accessing product information stored on exchange server host 101 by buyer client 210 and submitting successive competing bids to exchange server host 101 in order to sell the specified product or service to buyer client 210. In a manner similar to system 100 of FIG. 1, the bids are transmitted from seller clients 220-223 to exchange host server 101 via network 150, and the product information is provided to exchange server host 101 by buyer client 210 via network 150. Auction operations in accordance with system 200 are at times referred to as "reverse auctions" where sellers submit competing bids to sell specified products and/or services to a buyer.

The comparison of the competing bids submitted by seller clients 220-223 is performed by exchange server host 101. Exchange server host 101 is adapted to continuously receive and compare incoming bids, determine therefrom a bid status, and disseminate this bid status to all auction participants. The bid status includes information regarding the most competitive bid out of the bids received for the product, total number of bids received, any associated terms for the bids, and the like, and can be updated with each incoming new bid.

In a manner similar to system 100 of FIG. 1, in system 200, exchange server host 101 receives specified catalog contents for packaging and pushing to an electronic auction. Initial terms for the sale of the contents are specified and the auction is then automatically initiated using the previously specified contents and the previously specified terms. The auction proceeds with the receiving of bids for the contents from the remote bidders via the distributed computing network. A winning bid is selected and a sale of the contents is then completed based upon the terms of the most competitive bid.

As with system 100 of FIG. 1, the exchange server host 101 can be configured to communicate with seller clients 220-223 to implement any required automatic bid status refresh and item attribute updates. Automatic bid status refresh provides updated bid status to each of the auction participants, allowing each of them to track the status of the bidding process, track the status of their respective bids, and ascertain the competitiveness of their most recent bids as the auction operation unfolds.

Figure 3:
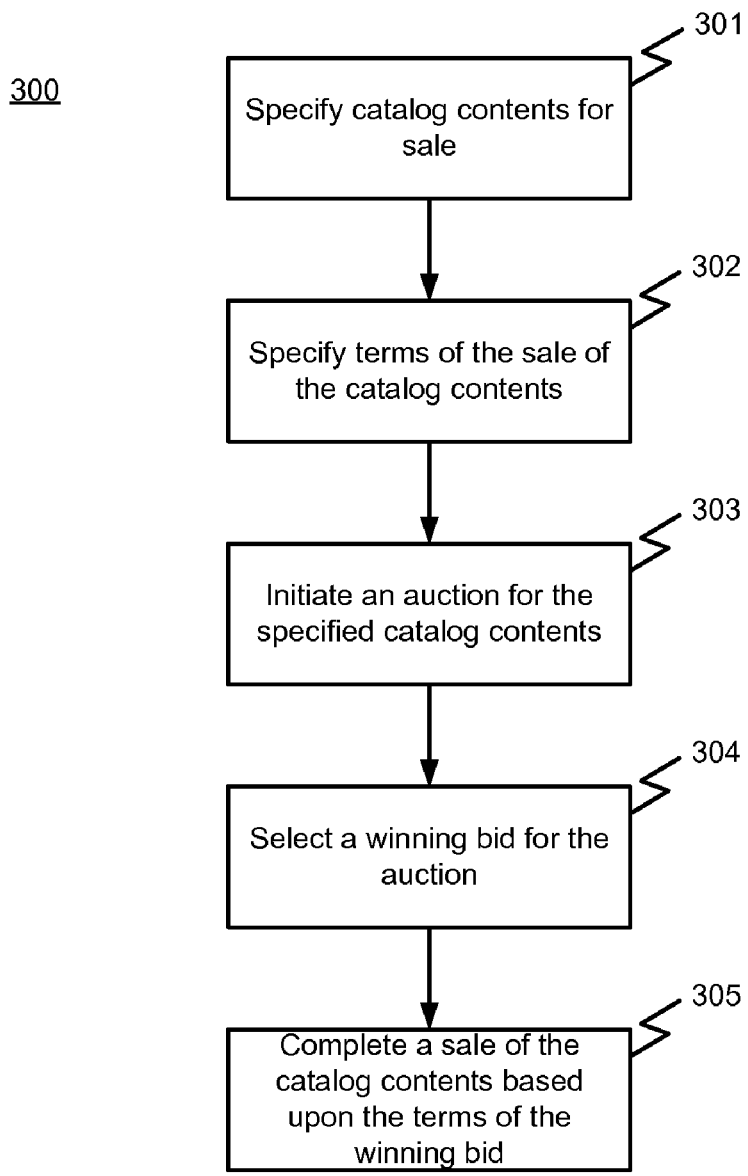
FIG. 3 shows a flowchart of the steps of a process in accordance with one embodiment of the present invention.

With reference now to FIG. 3, a flow chart of the steps of a process 300 in accordance with one embodiment of the present invention is shown. As depicted in FIG. 3, process 300 diagrams the operating steps for implementing catalog inventory auctions in an electronic exchange as performed by, for example, system 100 of FIG. 1.

Process 300 begins in step 301, where a seller (e.g., seller client 110 of FIG. 1) specifies catalog contents for sale. As described above, the exchange participant, in this case a seller client, identifies one or more items from a catalog for packaging for auction. The selection of the specific items can depend upon a number of factors, such as, for example, inventory concerns (e.g., excess supply of certain items), obsolescence (e.g., a certain product line is being discontinued), limited shelf life (e.g., perishable items), or the like. Those catalog products showing less than predicted demand tend to be good candidates for packaging for auction operations.

In step 302, the seller specifies terms for the sale of the catalog contents. The terms for the sale can include conditions such as packaging, delivery, enumeration of the authorized bidders, the minimum opening bid, a reserve (if any), and the like. In step 303, the exchange server host automatically initiates an auction for the specified catalog contents based upon the terms specified in step 302. In step 304, at the conclusion of the auction (e.g., expiration of the allotted time, etc.), a winning bid is selected. Subsequently, in step 305, a sale of the catalog contents is completed based upon the terms of the winning bid.

Figure 4:
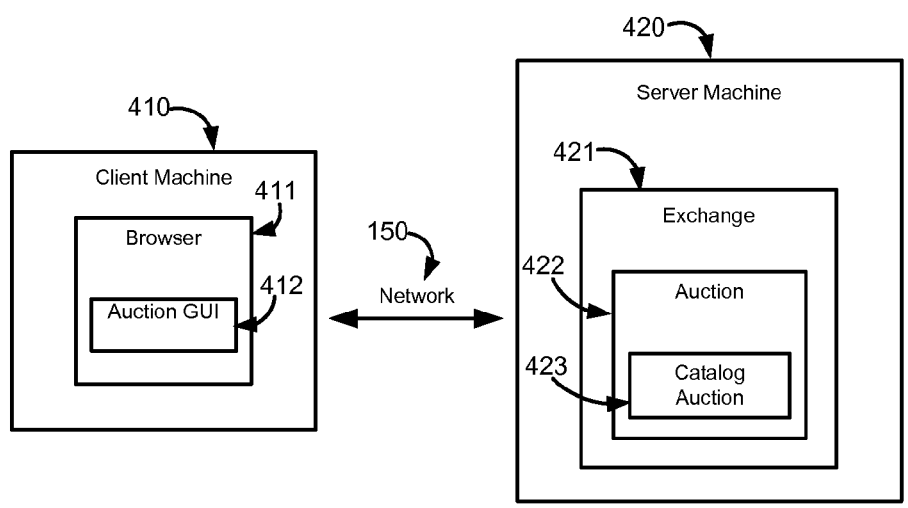
FIG. 4 shows a diagram of the software based components of a system in accordance with one embodiment of the present invention.

FIG. 4 shows a diagram of the relationship between the software components executing on a client computer system platform, client machine 410, and the software components executing on a server computer system platform, server machine 420, in accordance with one embodiment of the present invention.

As depicted in FIG. 4, client machine 410 executes a browser 411. As is well known, browser 411 functions as a client for browsing the World Wide Web, or compatible networks. Browser 411 is configured to receive information from servers on network 150, such as server 420, and to interpret and display the information graphically to a user. Browser 411 interprets HTML commands received from server 420 to display text and images within a graphical user interface (GUI). The GUI is customized to show components (e.g., text, images, buttons, fields, etc.) in accordance with the HTML information received from server 420. Using the HTML information, browser 411 implements an auction GUI 412 to provide an intuitive means for input and output with a user.

Server 420 functions as the exchange server host for the auction operations. Server 420 instantiates an exchange 420 which functions as an E-commerce site on the network 150. Exchange 421 is implemented, for example, by using a database program running on server machine 420. Exchange 421 implements one or more auctions 422 to facilitate the buying and selling of goods and services and implements catalog inventory auctions as shown by, for example, the steps of process 300 of FIG. 3. The automatic packaging and auction initiation functionality of server machine 420 is implemented by a catalog auction component 423.

Thus, present invention provides a method and system for implementing catalog inventory auctions in an electronic exchange. The present invention provides a solution for efficiently providing the price competitiveness of auction based selling with the efficiency aspects of catalog based selling. The present invention is readily configurable by a user to reduce risks inherent with setting pricing/terms of new items for electronic catalogs. Additionally, the present invention is compatible with widely used electronic commerce enabling technology.

Computer System Platform

Figure 5:
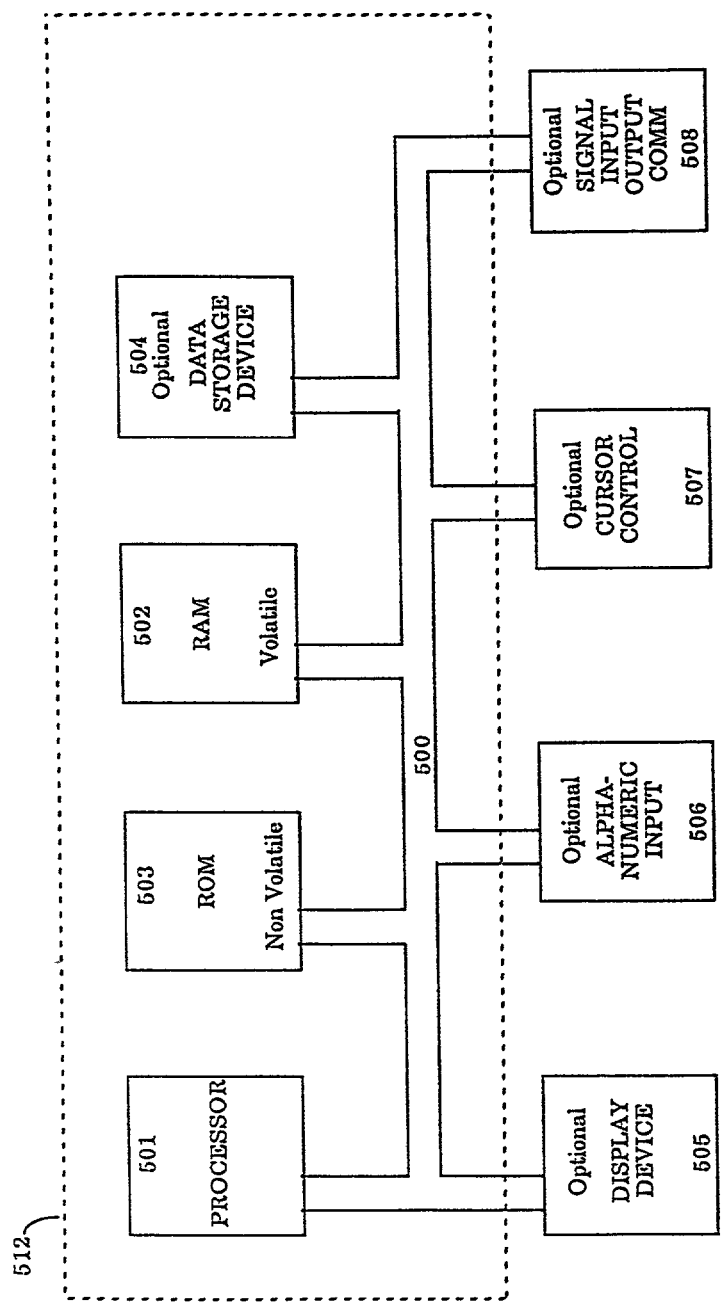
FIG. 5 shows the components of a computer system platform in accordance with one embodiment of the present invention.

With reference now to FIG. 5, a computer system 512 in accordance with one embodiment of the present invention is shown. Computer system 512 shows the components of a computer system in accordance with one embodiment of the present invention that provides the execution platform for implementing certain software based functionality of the present invention. As described above, certain processes and steps of the present invention are realized, in one embodiment, as a series of instructions (e.g., software program) that reside within computer readable memory units of a computer system (e.g., system 512) and are executed by the processor(s) of system 512. When executed, the instructions cause the computer system 512 to implement the functionality of the present invention as described above.

In general, computer system 512 shows the basic components of a computer system used to implement "server" machines and "client" machines. Computer system 512 comprises an address/data bus 500 for communicating information, one or more central processors 501 coupled with the bus 500 for processing information and instructions, a computer readable volatile memory unit 502 (e.g., random access memory, static RAM, dynamic, RAM, etc.) coupled with the bus 500 for storing information and instructions for the central processor(s) 501, a computer readable non-volatile memory unit 503. (e.g., read only memory, programmable ROM, flash memory, EPROM, EEPROM, etc.) coupled with the bus 500 for storing static information and instructions for the processor(s) 501. System 512 also includes a mass storage computer readable data storage device 504 such as a magnetic or optical disk and disk drive coupled with the bus 500 for storing information and instructions. Optionally, system 512 can include a display device 505 coupled to the bus 500 for displaying information to the computer user, an alphanumeric input device 506 including alphanumeric and function keys coupled to the bus 500 for communicating information and command selections to the central processor(s) 501, a cursor control device 507 coupled to the bus for communicating user input information and command selections to the central processor(s) 501, and a signal generating device 508 coupled to the bus 500 for communicating command selections to the processor(s) 501.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In an electronic commerce exchange hosted on a distributed computer network, an electronic auction method for specifying catalog contents for an electronic auction, comprising:

receiving at an exchange server catalog contents for an auction from an operator of a catalog-based selling operation, the catalog contents having first been sold at catalog terms by the operator of the catalog-based selling operation, wherein the catalog contents are selected for the auction based on one or more factors selected from a group of factors comprising demand for the catalog contents, obsolescence of the catalog contents, and perishability of the contents;

receiving at the exchange server from the operator of the catalog-based selling operation initial terms for a sale for the contents for the auction, wherein said initial terms are selected from a group consisting of delivery conditions and minimum opening bid;

initiating the auction for the contents with the exchange server using said catalog contents and said initial terms;

receiving, comparing, and updating continuously with the exchange server bids for the contents made to the exchange server from remote bidders via the distributed computer network;

determining with the exchange server a most competitive bid out of the bids received for the contents; and;

completing the sale of the contents with the exchange server based on the terms of the most competitive bid.

2. The method of claim 1, further including:

accessing with the exchange server a specification for an item for the auction, the specification for the item provided by a seller.

3. The method of claim 2, further including:

specifying with the exchange server initial terms for the sale of the contents, the initial terms including an allotted time for the auction.

4. The method of claim 1 wherein the distributed computer network is the Internet.

5. The method of claim 1 wherein the catalog includes a plurality of items, and wherein a number of items selected for auction is less than said plurality of the items.

6. The method of claim 1 wherein the auction is initiated automatically with the exchange server using the catalog contents and the initial terms.

7. The method of claim 1 wherein the sale of the contents is completed with the exchange server using the terms of the most competitive bid to replace corresponding terms for the contents listed in the catalog.

8. A server including a processor coupled to a computer readable memory, the memory containing computer readable instructions which when executed by the processor cause the server to specify catalog contents for an electronic auction exchange by:

receiving catalog contents for an auction from an operator of a catalog-based selling operation, the catalog contents having first been sold at catalog terms by the operator of the catalog-based selling operation, wherein the catalog contents are selected for the auction based on one or more factors selected from a group of factors comprising demand for the catalog contents, obsolescence of the catalog contents, and perishability of the contents;

receiving from the operator of the catalog-based selling operation initial terms for a sale for the contents for the auction, wherein said initial terms are selected from a group consisting of delivery conditions and minimum opening bid;

initiating the auction for the contents using the said catalog contents and said initial terms;

receiving, comparing, and updating continuously bids from the contents from remote bidders via a distributed computing network;

determining a most competitive bid out of the bids received for the contents;

designating an auction winner at the conclusion of the auction in accordance with the most competitive bid; and completing the sale of the catalog contents based on the terms of the most competitive bid.

9. The server of claim 8, further including:

accessing a specification for an item for the auction, the specification for the item provided by a seller.

10. The server of claim 8, further including:

specifying initial terms for the sale of the contents, the initial terms including an allotted time for the auction.

11. The server of claim 8 wherein the distributed computing network is the Internet.

12. The server of claim 8 wherein the catalog includes a plurality of items, wherein a number of items selected for auction is less than said plurality of the items.

13. The server of claim 8 wherein the auction is initiated automatically using the catalog contents and the initial terms.

14. The server of claim 8 wherein the sale of the catalog contents are completed using the terms of the most competitive bid to replace corresponding terms for the catalog contents listed in a catalog.

\* \* \* \* \*

UNITED STATES PATENT AND TRADEMARK OFFICE
CERTIFICATE OF CORRECTION

| | | |
|---|---|---|
| PATENT NO. | : 7,720,745 B2 | |
| APPLICATION NO. | : 09/912891 | |
| DATED | : May 18, 2010 | |
| INVENTOR(S) | : Kim Powell et al. | |

It is certified that error appears in the above-identified patent and that said Letters Patent is hereby corrected as shown below:

On Title Page 2; item (56); in column 1, under "Other Publications", line 6, delete "Acutions" and insert -- Auctions --, therefor.

In column 1, line 15, delete "for" and insert -- for the --, therefor.

In column 2, line 11, delete "exchanges" and insert -- exchange --, therefor.

In column 2, line 12, delete "auctions" and insert -- auction --, therefor.

In column 2, line 13-14, delete "commerce catalog based buying and selling, or simply" and insert -- commerce for catalog based transactions (e.g., buying and selling), or use of electronic commerce for providing simple --, therefor.

In column 2, line 15-16, delete "of efficiently making available in" and insert -- for offering a --, therefor.

In column 2, line 17, delete "buyers." and insert -- buyers in an efficient manner. --, therefor.

In column 2, line 18, delete "means" and insert -- mean --, therefor.

In column 2, line 18, delete "large" and insert -- a large --, therefor.

In column 2, line 19, delete "sale" and insert -- transaction (e.g., sale) --, therefor.

In column 2, line 19, delete "about" and insert -- regarding --, therefor.

In column 9, line 18, delete "503." and insert -- 503 --, therefor.

Signed and Sealed this
Twenty-sixth Day of July, 2011

David J. Kappos
*Director of the United States Patent and Trademark Office*